United States Patent [19]

Inaga

[11] 3,792,491

[45] Feb. 12, 1974

[54] MAGNETIC RECORDING AND/OR REPRODUCING APPARATUS

[75] Inventor: Katsu Inaga, Tokyo, Japan

[73] Assignee: Sony Corporation, Tokyo, Japan

[22] Filed: Mar. 30, 1972

[21] Appl. No.: 239,639

[30] Foreign Application Priority Data

Apr. 8, 1971 Japan ............................... 46-26364

[52] U.S. Cl......... 360/71, 242/195, 360/85, 360/95

[51] Int. Cl. ........................ G11b 5/00, G11b 15/32

[58] Field of Search ........... 274/4 R, 4 A, 4 C, 4 D; 242/195, 188-190, 197-199; 179/100.2 R, 100.2 T, 100.2 Z

[56] References Cited

UNITED STATES PATENTS

| | | | |
|---|---|---|---|
| 3,674,942 | 7/1972 | Sugaya et al. ................ | 179/100.2 Z |
| 3,305,188 | 2/1967 | Sampson ............................ | 242/197 |

*Primary Examiner*—Leonard D. Christian
*Attorney, Agent, or Firm*—Lewis H. Eslinger, Esq.; A. Sinderbrand, Esq.

[57] ABSTRACT

In an apparatus for magnetically recording and/or reproducing signals, such as video signals, on a magnetic tape extending between and wound on supply and take-up reels, and in which the tape between the reels is selectively guided in a first path removed from a tape guide drum and in a second path that extends about at least a portion of the guide drum periphery for scanning of the tape by a rotary magnetic head associated with the guide drum; the driving of the tape in each of the first and second paths is controlled by a sensing device which includes a light source and a light detector defining a light path therebetween which is intercepted by each of the first and second tape paths so that the light detector receives or detects light from the source to halt the driving of the tape only when a transparent leader provided at least at one end of the magnetic tape intercepts the light path.

8 Claims, 4 Drawing Figures

PATENTED FEB 12 1974

3,792,491

SHEET 1 OF 3

MAGNETIC RECORDING AND/OR REPRODUCING APPARATUS

This invention relates generally to magnetic recording and/or reproducing apparatus, such as, video tape recording and reproducing apparatus (VTR), and more particularly is directed to improvements in such apparatus of the type in which a magnetic tape extending between, and wound on supply and take-up reels, for example, in a tape cassette, is withdrawn from the cassette and wrapped about at least a portion of the periphery of a tape guide drum for scanning by a rotary magnetic head associated with the guide drum during recording and reproducing operations of the apparatus.

Automatic tape loading devices have been suggested in order to avoid the obvious disadvantages inherent in the manual threading of the tape from the reels about the tape guide drum for each recording or reproducing operation and the manual removal of the tape from about the guide drum whenever the reels are to be removed from the apparatus. A particularly desirable automatic tape loading device for a video tape recording and/or reproducing apparatus or VTR is disclosed in copending U.S. Pat. application Ser. No. 113,988, filed Feb. 9, 1971 in the name of Nobutoshi Kihara, and having a common assignee herewith. In such automatic tape loading device, a rotatable support, for example, in the form of a ring, extends around the guide drum and carries a plurality of guides, and a tape engaging member is also mounted on the ring or support member and is movable into and out of a guide path which is defined by the guides and spaced from the surface of the guide drum. The tape engaging member, in an inactive condition of the device, is displaced out of the guide path to engage the magnetic tape lying in a first tape path between the supply and take-up reels and which may be contained in a cassette or cartridge, and, upon turning of the ring, the tape engaging member is moved into the guide path to draw a loop of the tape from the cassette or cartridge into a second tape path in which one side of the loop is wrapped about the guide drum while the other side of the loop is engaged by the guides and maintained in the corresponding guide path spaced from the periphery of the drum. With the foregoing automatic tape loading device, the tape is wrapped about the tape guide drum in response to the selection of either the recording or the reproducing mode of operation of the apparatus, and the tape is removed from the guide drum and returned to its first path extending directly between the reels within the cassette upon the selection of the fast forward or rewind modes of operation so that the high speed travel of the tape in the latter modes of operation will not be frictionally resisted by engagement of the tape with the tape guide drum.

It has also been proposed to provide a magnetic recording and/or reproducing apparatus with an automatic shut-off device by which the driving of the tape, in any of the operating modes of the apparatus, is halted when the tape is fully unwound from either the take-up reel or the supply reel. One type of proposed automatic shut-off device includes an electro-optical arrangement having a light source and a photocell or light-sensitive element providing a control signal for halting the tape drive whenever that element receives light from the source passing through a transparent leader attached to each of the opposite ends of the magnetic tape. Such an electro-optical arrangement is easily applied to cassette type audio recording and reproducing apparatus in which the tape follows the same path for all operating modes of the apparatus. However, when the tape is made to follow different paths for the recording and reproducing modes and for the fast forward and rewind modes, respectively, as in the apparatus disclosed in U.S. Pat. application No. 113,988, identified more fully above, difficulties arise in the detection of the transparent leaders by the electro-optical arrangement when the tape is in each of those paths. Thus, in the foregoing patent application, it is proposed to detect the transparent leaders at a location where the two alternative tape paths coincide, that is, at a location within the cassette casing. In order to detect the transparent leaders at such location within the cassette casing, the latter is provided with a transparent partition past which the tape moves in each of its alternative paths, and a double reflecting prism element is formed or mounted on the transparent partition. When one or the other of the transparent leaders moves past the transparent partition of the cassette casing, a beam of light from a light source disposed at the outside of the casing passes through the transparent leader and partition and is reflected within the casing by the prism element to emerge through the transparent partition and leader and impinge on a photocell also located outside the cassette casing for providing the control signal by which the tape drive is rendered inoperative. However, the foregoing arrangement undesirably complicates the construction, and increases the cost of the tape cassette. Since the cassette is the exchangeable or interchangeable component of the recording and reproducing system, it is practically essential that the cost thereof be minimized to the fullest possible extent.

Accordingly, it is an object of this invention to provide a magnetic recording and/or reproducing apparatus in which the tape is made to follow two different paths for various modes of operation, and in which an improved automatic shut-off device halts operation of the tape drive upon complete unwinding of the tape from either the supply reel or the take-up reel during any of the operating modes of the apparatus.

Another object is to provide a magnetic recording and/or reproducing apparatus, as aforesaid, in which the automatic shut-off device includes an electro-optical arrangement for detecting a transparent leader at least at one end of the magnetic tape when the latter is traveling in either of the paths thereof, without complicating the construction of the cassette containing the tape and the supply and take-up reels.

In accordance with an aspect of this invention, the driving of the tape in each of the alternative paths thereof is controlled by a sensing device which includes a light source and a light detector defining a light path therebetween which is intercepted by each of the tape paths so that the light detector receives or detects light from the source to halt the driving of the tape only when a transparent leader attached to at least one end of the magnetic tape intercepts the light path.

The above, and other objects, features and advantages of the invention, will be apparent in the following detailed description of an illustrative embodiment which is to be read in connection with the accompanying drawings, wherein.

Figure 1:
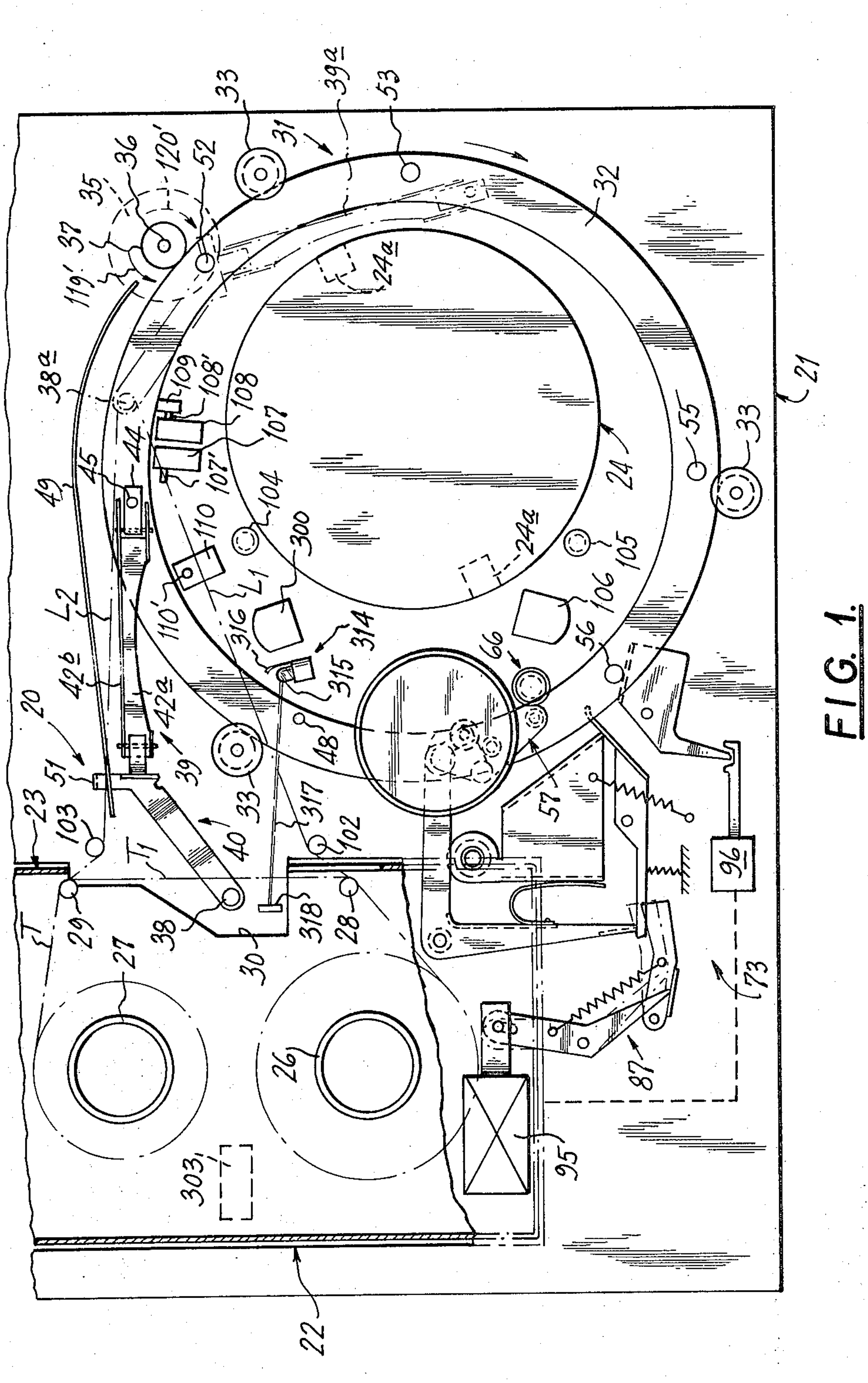
FIG. 1 is a schematic top plan view of a magnetic recording and reproducing apparatus with an automatic tape loading device and having an automatic shut-off device in accordance with an embodiment of this invention.
Figure 2:
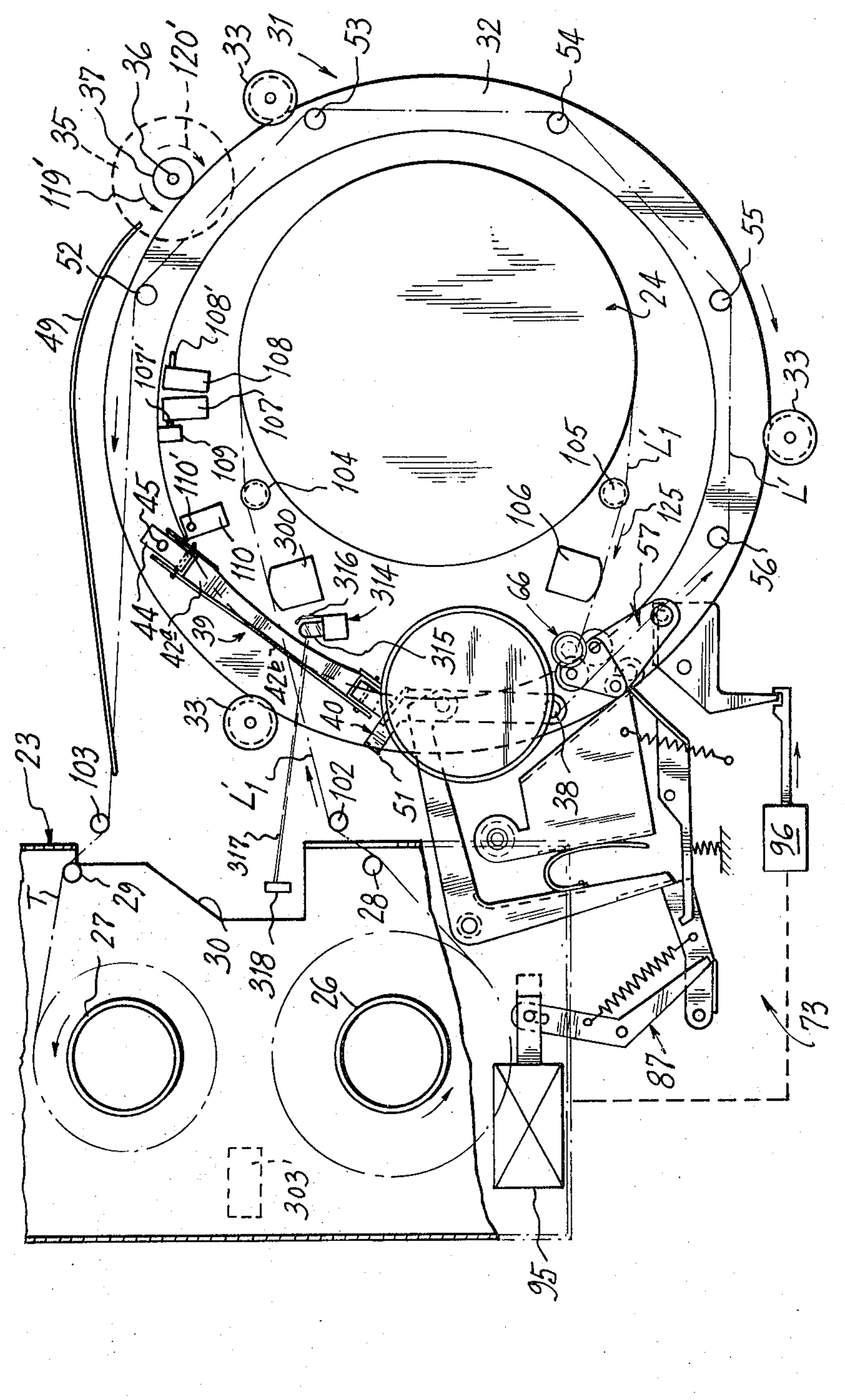
FIG. 2 is a view similar to that of FIG. 1, but showing the tape loading device in another position thereof.

Referring to the drawings in detail, and initially to FIGS. 1 and 2 thereof, it will be seen that the invention is there shown applied to a cassette-type video tape recording and reproducing apparatus or VTR 20 having an automatic tape loading device of the type described in detail in the copending U.S. application Ser. No. 113,988, identified more fully above. However, it should be understood that the invention is equally applicable to any other magnetic recording and reproducing apparatus in which the magnetic tape is carried by supply and take-up reels and is drawn from between such reels and wrapped at least partly about a guide drum having a magnetic head or heads associated therewith for scanning the tape guided by the drum during recording and reproducing modes of operation, and in which the tape is removed from the guide drum, for example, to travel directly between the reels, during fast forward and rewinding modes of operation.

The cassette-type VTR 20 is hereinafter described only to the extent necessary for an understanding of the present invention and generally comprises a chassis 21 having a cassette holder 22 mounted above the forward portion of the chassis to receive and support a cassette 23 containing a supply of magnetic tape. The apparatus 20 is further shown to comprise a tape guide drum 24 suitably mounted above the back portion of the chassis 21 and defining a circumferential slot in which one or more rotary magnetic heads, indicated in broken lines at 24*a* on FIG. 1, are exposed to scan the magnetic tape when the latter is wrapped about a predetermined extent of the periphery of drum 24.

The magnetic tape T is shown to be wound on a supply reel 26 and a take-up reel 27 which are rotatable within cassette 23, and the tape T extends over guide pins 28 and 29 which are disposed at opposite sides of an opening 30 provided at the back portion of cassette 23 so that a run $T_1$ of the tape extending between reels 26 and 27 will be exposed at cassette opening 30, as shown on FIG. 1.

The automatic tape loading device 31 of the apparatus 20 is shown to comprise a support member 32, for example, in the form of a circular ring which extends around drum 24. The ring 32 is supported for rotation about its center, for example, by a number of grooved rollers or pulleys 33 which engage the periphery of ring 32 at locations spaced apart about the latter and which are rotatably supported above the chassis. The support ring 32 may be advantageously mounted so that its plane of rotation slopes downwardly in the forward direction below the plane of rotation of reels 26 and 27, whereas the drum 24 is mounted so that the plane of rotation of its magnetic head or heads also slopes downwardly in the forward direction so as to substantially bisect the angle included between the plane of rotation of the reels and the plane of rotation of support ring 32. As is shown particularly on FIG. 1, the cassette 23 is preferably laterally offset with respect to the axis of drum 24, and ring 32 is eccentrically located with respect to drum 24 so that the center of rotation of ring 32 is displaced forwardly, that is, in the direction toward cassette 23, from the axis of drum 24.

Support ring 32 is turned by a reversible D.C. electric motor 35 (shown in broken lines on FIGS. 1 and 2) which is suitably mounted at the underside of the chassis and has its shaft 36 extending upwardly through an opening in the chassis adjacent the periphery of ring 32 and carrying a rubber-surfaced drive roller 37 which frictionally engages the periphery of the ring. Thus, by suitable control of motor 35, support ring 32 can be turned in the clockwise or tape loading direction from its inactive position shown on FIG. 1 to its operative position shown on FIG. 2, and, similarly, for unloading the tape, ring 32 can be turned in the counterclockwise direction from its operative position shown on FIG. 2 to its initial or inactive position shown on FIG. 1.

A tape engaging member 38 which is shown in the form of an upstanding, rotatable flanged pin or roller is mounted, by way of an arm assembly 39, on support ring 32 so as to move with the latter during turning of the support ring while being movable relative to ring 32 both in the directions generally toward and away from the center of rotation of the ring and in directions generally perpendicular to the plane of rotation of ring 32. As shown, the arm assembly 39 may include a bracket 40 having the tape engaging member 38 extending upwardly from its free end portion, and generally parallel arms or links 42*a* and 42*b* which are pivotally connected, at one end, to bracket 40 and, at the opposite end, pivotally connected to a bracket 44 swingable on a pivot 45 carried by support ring 32 and extending generally perpendicular to the plane of rotation of the latter. It will be apparent that upward and downward swinging of the parallel arms or links 42*a* and 42*b* permits upward and downward movement of the tape engaging member 38, that is, movement in directions generally perpendicular to the plane of rotation of ring 32 with the tape engaging member 38 remaining substantially erect during such movement of tape engaging member 38 outwardly away from ring 32, for example, to the position shown on FIG. 1, or inwardly to a position above ring 32, for example, as shown on FIG. 2.

A tension spring (not shown) may extend diagonally between links 42*a* and 42*b* for yieldably urging links 42*a* and 42*b* to swing downwardly toward ring 32, and a torsion spring (not shown) may be provided around pivot pin 45 for yieldably urging arm assembly 39 to swing about pivot pin 45 in the counterclockwise direction, as viewed on FIG. 1, that is, to yieldably urge tape engaging member 38 to the position above ring 32, as shown on FIG. 2. The inward swinging of arm assembly 39 about pivot 45 may be limited by a stop 48 (FIG. 1) extending upwardly from ring 32 and being engageable by bracket 40, while the downward swinging of the arm assembly may be limited by the engagement of bracket 40 with the upper surface of ring 32.

In order to dispose tape engaging member 38 in the position shown on FIG. 1 when ring 32 is in its inactive position, that is, in order to raise arm assembly 39 and swing the latter outwardly relative to ring 32, the tape loading device 31 further includes an arcuate cam plate 49 suitably fixed relative to the chassis so as to extend along a portion of cam ring 32 and to diverge forwardly from the latter to adjacent the cassette 23. A bent tab 51 extends outwardly and then downwardly from bracket 40 and is slidably engageable over the top edge of cam plate 49 to act as a cam follower. The top edge of cam plate 49 is shaped so that, during turning of ring 32 in the counterclockwise direction from the position of FIG. 2 to the inactive position of FIG. 1, bent tab 51 acting as a cam follower comes into engagement with the top edge of cam plate 49 and thereafter moves along the cam plate for both raising arm assembly 39 and swinging the arm assembly outwardly away from ring 32. When ring 32 is disposed in its inactive position shown on FIG. 1, cam plate 49 positions arm assembly 39 so that the tape engaging member 38 carried by the latter will extend upwardly into opening 30 at the back of cassette 23 and be disposed in front of the run $T_1$ of the tape which extends between guide pins 28 and 29 and is exposed at the cassette opening. Of course, it is intended that tape engaging member 38 should be disposed at the position shown on FIG. 1 prior to the positioning of the cassette 23 at the operative position thereof on holder or support 22, and further that the cassette 23 should be moved downwardly from above to its operative position, whereby the downward movement of the cassette results in the entry of tape engaging member 38 into cassette opening 30.

Support ring 32 further carries a series of guide pins 52,53,54,55 and 56 which extend upwardly from the ring at spaced apart locations along approximately the half of ring 32 which is diametrically opposed to that portion of the ring along which arm assembly 39 extends when it is in overlying relation to the ring as shown on FIG. 2. The guide pins 52–56 define a guide path spaced from the periphery of drum 24 and are engageable by the tape, as hereinafter described, when device 31 is operated to wrap a portion of the tape on a predetermined peripheral extent of drum 24.

Also mounted on support ring 32 between guide pin 56 and the location of tape engaging member 38 when the latter is disposed above ring 32, as on FIG. 2, is a pinch roller assembly 57, and a capstan 66, which may be driven by a motor 301 (FIG.4), is disposed inside the circular path of travel of ring 32 and located so that pinch rollers of assembly 57 will be adjacent thereto when ring 32 is turned to its operative position (FIG. 2). The illustrated tape loading device 31 further comprises a pressing assembly 73 which is operative to press the pinch rollers of assembly 57 against capstan 66 with the tape there-between upon the attainment by ring 32 of its operative position shown on FIG. 2. The pressing assembly 73 is fully described in the copending U.S. Application Ser. No. 113,988 identified more fully above and forms no part of this invention. However, it may be mentioned that the pressing assembly 73 generally includes a latch device 87 which is set by energizing of a solenoid 95 in response to closing of a switch 96 when ring 32 attains its operative position (FIG. 2). Setting of latch device 87 retains pressing assembly 73 in its operative condition for pressing the pinch rollers of assembly 57 against capstan 66, and latch device 87 is released to permit reutrn of pressing assembly 73 to its inoperative condition (FIG. 1), and thereby freeing pinch roller assembly 57 from capstan 66, upon deenergizing of solenoid 95.

In order to further guide the tape withdrawn from cassette 23, apparatus 20 has fixed guide pins 102 and 103 disposed in back of, and adjacent to the guide pins 28 and 29, respectively, of cassette 23 when the latter is supported on the cassette holder 22. Further, a fixed guide pin 104 is disposed adjacent drum 24 approximately on a line extending tangentially from guide pin 102 to the surface of drum 24, and a guide pin 105 is disposed adjacent drum 24 approximately on a line extending tangentially between drum 24 and capstan 66. Preferably, guide pin 104 is substantially erect and is at a level that corresponds to that of the tape being withdrawn from cassette 23, and guide pin 105 is inclined from the vertical so as to be substantially perpendicular to the plane of rotation of ring 32 and is at a level substantially lower than that of guide pin 104 for engagement with the tape run extending from the surface of drum 24 to the tape engaging member 38 when ring 32 is in its operative position indicated on FIG. 2.

A fixed magnetic recording and/or reproducing head 106 is mounted on the chassis between capstan 66 and guide pin 105 so as to be engaged by the tape when ring 32 is in its operative position, and such fixed magnetic head 106 may be employed for recording and/or reproducing audio and/or control signals on the tape, whereas the rotary head or heads associated with drum 24 may be used for recording and/or reproducing video signals in skewed tracks extending obliquely across the tape.

A fixed magnetic erasing head 300 is also mounted on the chassis between guide pins 102 and 104 so as to be engaged by the tape between supply reel 26 and the surface of drum 24 when ring 32 is in its operative position (FIG. 2). The erasing head 300 may be supplied with erasing signals, by which, during recording operation of VTR 20, signals already recorded on the tape are erased prior to the recording of signals on the tape by the rotary head or heads associated with drum 24.

In order to limit the turning of ring 32 to its operative position shown on FIG. 2 and the return movement of the ring to its inactive position shown on FIG. 1, tape loading device 31 is shown to have limit switches 107 and 108 (FIGS. 1 and 2) suitably mounted on the chassis adjacent ring 32 and having actuators 107′ and 108′, respectively, which are selectively depressed by a switch operating member 109 on the ring when ring 32 is in its operative position and in its inactive position, respectively. The switches 107 and 108 are interposed in electrical circuits (not shown) for motor 35 and are normally closed and selectively opened by the engagement of switch operating member 109 with their respective actuators 107′ and 108′. Device 31 further has a normally closed switch 110 also mounted on the chassis adjacent ring 32 and being spaced a relatively small angular distance, for example, approximately 30°, from switch 107 in the counterclockwise direction, as viewed on FIGS. 1 and 2, so that the actuator 110′ of switch 110 will be engaged by switch operating member 109 to open the normally closed switch 110 when ring 32 is turned by the described relatively small angular extent in the counterclockwise direction from its operative position shown on FIG. 2.

Figure 4:
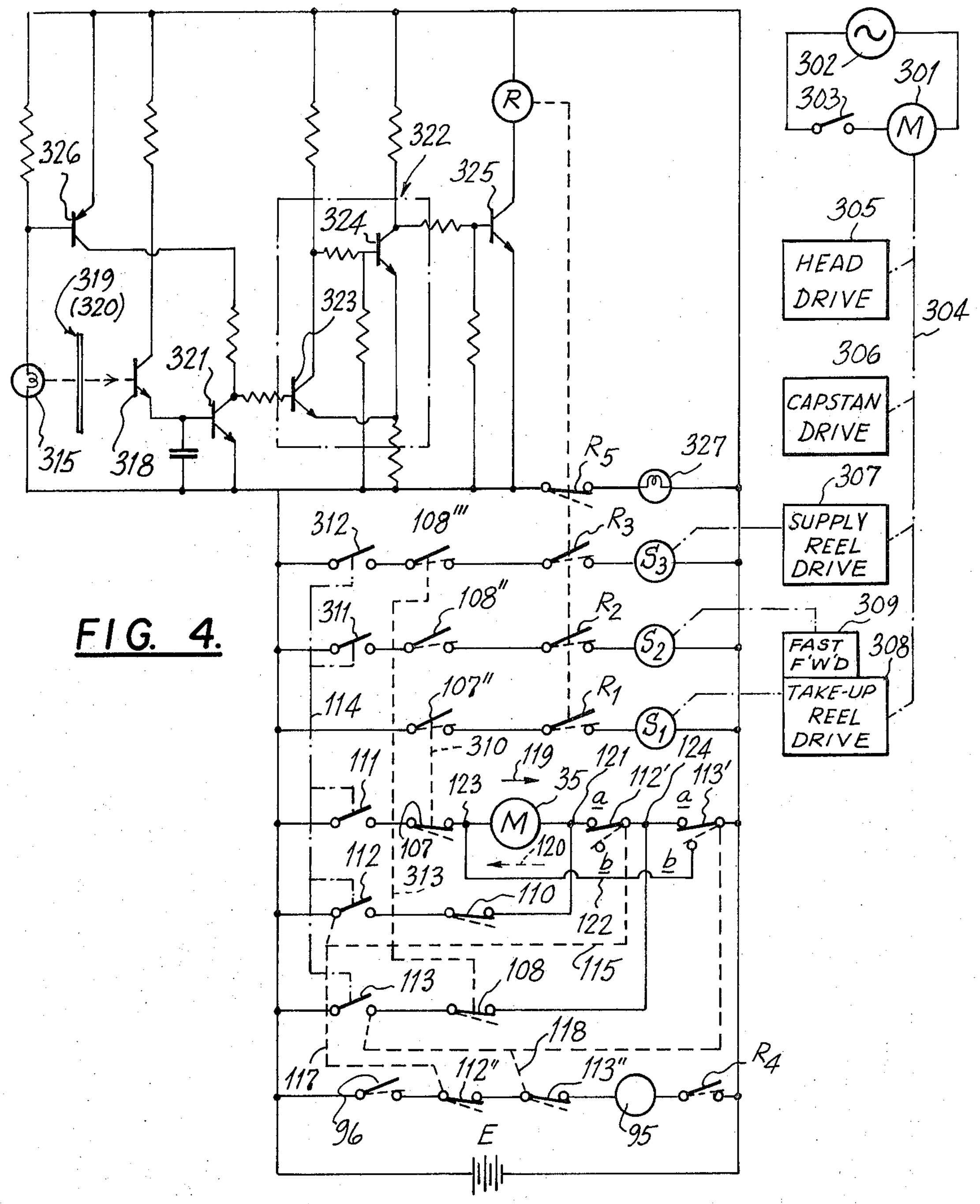
FIG. 4 is a schematic circuit diagram showing a system for controlling the operation of the tape drive in the apparatus of FIGS. 1 and 2 in accordance with this invention.

Referring now to FIG. 4, it will be seen that the controls for the VTR 20 may comprise a "play" switch 111, an "instantaneous stop" switch 112 and a "full stop" switch 113 which may be arranged adjacent to each other at a control panel of the recording and reproducing apparatus or VTR 20 and which are normally open, as shown. The switches 111, 112 and 113 are selectively actuable to their closed positions, for example by manual operation of respective pushbuttons. Further, by means of conventional mechanical latching devices (not shown), each of the switches 111, 112 and 113 may be held in its closed position following actuation of its respective pushbutton, and the latching devices are mechanically interconnected in a conventional manner and as schematically indicated by the dot-dash line 114 on FIG. 4 so that, upon the actuation of any one of the switches 111, 112 and 113 to its closed position, any other one of the switches 111, 112 and 113 previously held or latched in its closed position is released and returned to its normally open position. The switches 112 and 113 are further shown to be ganged or mechanically interconnected, as indicated by the broken lines 115 and 116, with reversing switches 112' and 113', respectively. The switches 112' and 113' normally close their respective contacts *a* when the switches 112 and 113, respectively, are in their normal open positions. In response to closing of the switches 112 and 113, the ganged switches 112'and 113' are respectively actuated to engage their contacts *b*. The switches 112 and 113 are further ganged or mechanically connected with switches 112'' and 113'', respectively, which are normally closed and actuated to thier open conditions in response to closing of the respective switches 112 and 113.

As shown, the reversible D.C. motor 35 for driving support ring 32 is connected to the opposite terminals of an electrical source E through switch 111 in series with switch 107, and through contacts *a* of switches 112' and 113' in series, respectively. Thus, when "play" switch 111 is closed and switches 112' and 113' are in their normal positions indicated in full lines on FIG. 4, current flows through motor 35 in the direction of the arrow 119 until such time as limit switch 107 is opened, and such current flow through motor 35 effects rotation of its shaft in the direction of the arrow 119' on FIGS. 1 and 2 for turning ring 32 in the clockwise direction. The switches 112 and 110 are shown to be connected in series between one terminal of source E and a junction 121 between motor 35 and contact *a* of switch 112', and a conductor 122 extends from a junction 123 between motor 35 and limit switch 107 and is connected to contact *b* of both switches 112' and 113'. The switches 113 and 108 are shown to be connected in series between a terminal of source E and a junction 124 between switch 112' and contact *a* of switch 113. Switches 112'' and 113'' are shown to be connected in series with the previously described switch 96 in the circuit for energizing solenoid 95 of the latch device 87. When the switch 112 or the switch 113 is closed, the effect of such closure and of the consequent actuation of the reversing switch 112' or 113' is to cause current flow through motor 35 in the direction of the arrow 120 on FIG. 4, with the result that the motor is rotated in the direction of the arrow 120' on FIGS. 1 and 2 for effecting turning of support ring 32 in the counterclockwise direction.

The VTR 20 with a tape loading device 31 as described above is manually controllable to operate as follows:

With ring 32 initially in its inactive position shown on FIG. 1, and a cassette 23 located on the holder 22 therefor, tape engaging member 38 extends upwardly into opening 30 at the back of the cassette and engages in front of the tape in the path $T_1$ exposed at such opening. Upon closing of "play" switch 111, current is made to flow from source E through switches 111 and 107, through motor 35 in the direction of arrow 119 and then through contacts *a* of switches 112' and 113' back to the source. Thus, motor 35 is driven in the direction of the arrow 119' on FIG. 1 to cause a clockwise rotation of ring 32. During such clockwise rotation of ring 32 away from its inactive position, tape engaging member 38 is moved with the support ring and withdraws tape from the cassette to form a tape loop L. I will be seen that the tape loop L thus formed includes a side or run $L_1$ extending from tape engaging member 38 past erasing head 300 to guide pin 102 and facing toward drum 24 and a side or run $L_2$ extending between tape engaging member 38 and guide pin 103 and facing away from the guide drum. During the initial clockwise turning of support ring 32, the pinch roller assembly 57 and the adjacent guide pin 56 move into the loop L between the runs $L_1$ and $L_2$ thereof and, as clockwise rotation of ring 32 is continued, for example, to the operative position shown on FIG. 2, the tape loop is progressively lengthened, for example, as indicated at L' on FIG. 2, and the other guide pins 55,54,53 and 52 move successively into such enlarged loop. The movement of pinch roller assembly 57 and the successive guide pins 56–52 into the progressively enlarging loop under the tape extending between guide pins 102 and 104 is made possible by the described slanting plane of rotation of support ring 32 which results in the ring 32 and the elements carried thereby being at a relatively low level at the portion of the ring between drum 24 and cassette 23.

During the described clockwise rotation of ring 32 to the operative position shown on FIG. 2, the side $L'_1$ of the progressively enlarged loop L' is wrapped about a substantial peripheral extent of drum 24 and the run of that side of the loop extending from drum 24 to tape engaging member 38 is brought adjacent capstan 67 and the fixed magnetic head 106, as shown on FIG. 2. Further, as the tape loop is progressively lengthened, the other side $L'_2$ thereof which extends from tape engaging member 38 to guide pin 103 is engaged by guide pins 52–56 on ring 32, and such guide pins 52–56 define a guide path for holding the side $L'_2$ of the lengthened loop away from the surface of drum 24 and away from the fixed heads 106 and 300.

Further, by reason of the slanting plane of rotation of ring 32, the tape engaging member 38 is moved to a relatively low level when it reaches the position shown on FIG. 2 so that the side $L'_1$ of the tape loop L' which is wrapped around a substantial peripheral extent of the drum 24 forms a portion of a helix on the surface of the drum, that is, is inclined with respect to the plane of rotation of the rotary head or heads 25 so that such head or heads will scan skewed tracks on the tape.

When ring 32 reaches the position shown on FIG. 2, switch operating member 109 engages actuator 107' of switch 107 to open the latter and, as is apparent from FIG. 4, to interrupt the circuit for passing current through motor 35 in the direction of the arrow 119. Hence, turning of ring 32 is halted at its operative position.

As previously described, the movement of ring 32 to its operative position causes release of the latch lever 83 and also the closing of switch 96 so that pressing assembly 73 is operated to press the pinch rollers of assembly 57 against capstan 66 with the tape therebetween for driving the tape in the direction of the arrow 125 on FIG. 2. So long as solenoid 95 remains energized by the closing of switch 96 and the maintenance of switches 112'' and 113'' in their normal closed positions, latch device 87 is effective to cause pressing assembly 73 to maintain the pinch rollers against the capstan and thereby cause drive of the tape therebetween so long as the capstan is rotated.

When it is desired to halt the recording or reproducing operation of apparatus 20 without unwrapping or unloading the tape from around drum 24, the "instantaneous stop" switch 112 is closed and, as a result of the interconnection of the mechanical latching mechanisms indicated at 114, the previously closed "play" switch 111 is released and returned to its open position. Closing of switch 112 causes displacement of switch 112' to the position shown in broken lines on FIG. 4 to close its contact *b*, by reason of the mechanical connection indicated at 115, and further causes opening of the switch 112'' by reason of the mechanical connection 117. The opening of switch 112'' deenergizes solenoid 95 to release latch device 87 and allow pressing assembly 73 to permit the freeing of pinch roller assembly 57 from capstan 66. The closing of switch 112 completes an energizing circuit for the motor 35 from source E through switches 112 and 110, through motor 35 in the direction of the arrow 120, through conductor 122 to switch 112' by way of its closed contact *b*, and then through switch 113'back to source E. Thus, simultaneously with the release of latch device 87 and the consequent removal from pinch roller assembly 57 of the force urging the pinch rollers against capstan 66, ring 32 is turned in the counterclockwise direction from the position shown on FIG. 2 until switch operating member 109 moves from the position shown on FIG. 2 to a position where it engages the actuator 110' of switch 110 for opening the latter. It will be apparent that opening of switch 110 interrupts the circuit for energizing motor 35 and hence ring 32 halts at a position that is angularly displaced from its operative position by approximately 30°. Such angular displacement of ring 32 is sufficient to remove the tape from engagement with capstan 66 so that driving of the tape is halted while the side $L'_1$ of the tape loop remains substantially in wrapped engagement with the periphery of drum 24.

When it is desired to again initiate the recording or reproducing operation of apparatus 20, the "play" switch 111 is again closed and, through the mechanical interconnection indicated at 114, switch 112 is opened. The closing of switch 111 again causes driving of motor 35 in the direction indicated by the arrow 119' on FIGS. 1 and 2, whereby ring 32 is turned in the clockwise direction back to the position shown on FIG. 2 and the pinch roller assembly 57 is again acted upon by the pressing device 73 to engage the tape between the pinch rollers and capstan 66 for driving the tape which is once again engaged with the fixed magnetic head 106.

When it is desired to halt the recording or reproducing operation of apparatus 20 and to return the tape to cassette 23, the "full stop" switch 113 is closed and, through the mechanical interconnection 114, the previously closed switch 111 or 112 is opened. Closing of switch 113 effects displacement of reversing switch 113' through the mechanical interconnection 116 so that switch 113' is moved to the position shown in broken lines on FIG. 4 to close its contact *b*, and closing of switch 113 further causes opening of switch 113'' through the mechanical interconnection 118. Thus, if ring 32 is in its operative position shown on FIG. 2 when switch 113 is closed, the opening of switch 113' again causes deenergizing of solenoid 95 to remove the force urging pinch roller assembly 57 against capstan 66, as described above in connection with the closing of switch 112. Further, closing of switch 113 completes a circuit for energizing motor 35 from source E through switches 113 and 108 to junction 124, through switch 112' and motor 35 in the direction of arrow 120, and then through conductor 122 and closed contact *b* of switch 113' back to the source E. Thus, motor 35 is rotated in the direction 120' on FIG. 2 to turn ring 32 in the counterclockwise direction. During such counterclockwise turning of ring 32, take-up reel 27 is driven, as hereinafter described, in the direction for rewinding the tape thereon so that, as ring 32 turns from the position shown on FIG. 2 to the inactive position shown on FIG. 1, the tape loop L is progressively reduced in size until such loop completely disappears and the tape again lies in the path $T_1$ which extends between guide pins 28 and 29 of cassette 23. When ring 32 returns to its inactive position of FIG. 1, switch operating member 109 engages actuator 108' of switch 108 to open the switch 108 and thereby interrupt the circuit for energizing motor 35. Thus, the turning of ring 32 is halted with all of the parts of the tape loading device 31 in their original or inactive positions shown on FIG. 1.

As shown on FIG. 4, the drive motor 301 isconnected to an A.C. source 302 through a normally open switch 303 which, as indicated on FIG. 1, is suitably mounted under cassette holder 22 so as to be closed in response to the positioning of a cassette 23 in the holder. Thus, motor 301 is rendered operative when a cassette is placed in its operative position on holder 22. The shaft of motor 301 is connected, as indicated schematically at 304 on FIG. 4, to a head drive assembly 305 for driving the rotary magnetic heads associated with tape guide drum 24, to a capstan drive assembly 306 for driving the capstan 66; to a supply reel drive assembly 307 which, when rendered operative as hereinafter described, drives the supply reel 26 of the operatively positioned cassette at high speed in the direction for winding the tape thereon, as during a fast-rewinding operation; and to a take-up reel drive assembly 308 which, when rendered operative as hereinafter described, drives the take-up reel 27 of the cassette in the direction for winding the tape thereon either at a relatively slow speed, as during a recording or reproducing operation of apparatus 20, or at a high speed, as during a fast-forward operation which occurs when a fast-forward control 309 of the take-up reel drive assembly is actuated, as hereinafter described. Thus, when the cassette 23 is operatively psotioned on holder 22, the rotary heads associated with guide drum 24 and the capstan 66 are rotated, and rotary power is supplied to supply reel drive assembly 307 and to take-up reel drive assembly 308 by motor 301. Of course, the rotated capstan 66 will be effective to drive the magnetic tape only after the "play" switch 111 has been actuated to cause movement of ring 32 to its operative position (FIG. 2), and thereby to engage the tape between capstan 66 and pinch roller assembly 57. Further, in the illustrated apparatus 20, the take-up reel drive assembly 308 is rendered operative to drive take-up reel 27 only after ring 32 arrives at its operative position. For example, as shown on FIG. 4, take-up reel drive assembly 308 may be rendered operative to drive take-up reel 27 at the relatively slow speed for recording or reproducing signals on the tape only upon energizing of a solenoid $S_1$ which is connected to the voltage source E through a normally open switch 107'' which is connected with switch 107, as indicated schematically at 310, so as to close switch 107'' when ring 32 arrives at its operative position (FIG. 2). Thus, when ring 32 arrives at its operative position, solenoid $S_1$ is energized through closed switch 107'' to actuate take-up reel drive assembly 308 and thereby cause the take-up reel 27 to be rotated for taking up the tape as the latter is driven by capstan 66 and pinch roller assembly 57.

The controls for the VTR 20 are further shown to include a "fast forward" switch 311 and a "rewind" switch 312 which are normally open, as shown on FIG. 4, and which may be arranged on the control panel adjacent the other operating mode control switches 111, 112 and 113 so as to be selectively actuable to their closed positions, for example, by manual operation of respective pushbuttons. The switches 311 and 312 may also be provided with conventional mechanical latching devices (not shown) by which each of the switches 311 and 312 may be held in its closed position following actuation thereof. The latching devices of switches 311 and 312 are also indicated by the broken line 114 to be mechanically interconnected with each other and with the latching devices of switches 111, 112 and 113 so that, upon the actuation of any one of the switches 111, 112, 112, 311 and 312 to its closed position, any other one of such switches previously held or latched in its closed position is released for return to its normally open position.

The switches 311 and 312 are shown to control the energization of respective solenoids $S_2$ and $S_2$ which are provided for effecting operation of the fast forward control 309 and the supply reel drive assembly 307, respectively. Thus, the fast forward control 309 is actuated in response to energization of solenoid $S_2$ for causing the take-up reel drive assembly 308 to effect the relatively high speed rotation of take-up reel 27. Similarly, the supply reel drive assembly 307 is rendered operative to effect the high speed rewinding of the tape on supply reel 26 only upon the energizing of solenoid $S_3$.

In order to ensure that the fast forward or rewinding operations of the VTR 20 can only occur with ring 32 of tape loading device 31 in its inoperative position (FIG. 1) that is, with the tape removed from guide drum 24 and wholly contained within the cassette 24, the control circuits of FIG. 4 are shown to include normally open switches 108'' and 108'' which are respectively connected in series with switches 311 and 312 in the circuits for energizing solenoids $S_2$ and $S_3$. The switches 108'' and 108''' are connected, as indicated schematically by the broken line 313, with the switch 108 so that switches 108''and 108''' are actuated to their closed positions, indicated in broken lines on FIG. 4, only when ring 32 is in its inoperative position (FIG. 1) where switch operating member 109 is effective to open switch 108 and simultaneously close switches 108'' and 108'''.

In accordance with the present invention, the VTR 20 having an automatic tape loading device 31, as described above, is further provided with an automatic shut-off device indicated generally at 314 on FIGS. 1 and 2, and by which the driving of the tape in any of the described operating modee of the apparatus is halted when the tape is fully unwound from either the supply reel 26 or the take-up reel 27. The automatic shut-off device 314 in accordance with this invention is shown to include a light source 315 provided with a reflector 316 for projecting a beam of light 317 in a path toward a photo-cell or light-sensitive element 318. In accordance with this invention, the light source 315 and photocell 318 are respectively located so that the path of light beam 317 therebetween is intercepted by the path of the tape T when the latter is wholly contained within cassette 23, for example, the path $T_1$ of the tape between guides 28 and 29 in the cassette (FIG. 1), and also intercepted by the path of the tape when tape loading device 31 is in its operative condition to withdraw a loop of the tape from the cassette 23 and to wrap the side $L'_1$ of the loop about a portion of the periphery of guide drum 24. More specifically, in the embodiment of the present invention shown on the drawings, the photo-cell 318 is suitably mounted on the chassis 21 so as to extend upwardly into the opening 30 of cassette 23 when the latter is operatively positioned on holder 22, and the light source 315 is suitably mounted on chassis 21 within ring 32 at a location between guides 102 and 104 so as to direct the beam of light 317 toward photo-cell 318 along a path that is intercepted by the path $L'_1$ of the tape extending between guides 102 and 104 when ring 32 is moved to its operative position (FIG. 2) for wrapping the tape about a portion of the periphery of guide drum 24. Of course, it will be apparent that the positions of the light source 315 and the photo-cell 318 may be interchanged.

Figure 3:
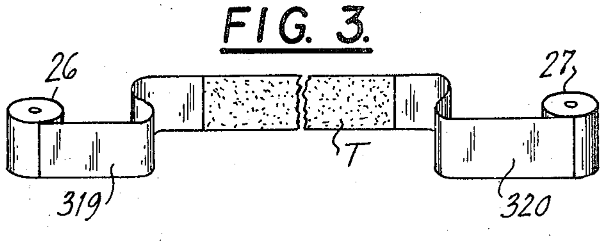
FIG. 3 is a perspective view showing a magnetic tape with transparent leaders at its opposite ends attached to supply and take-up reels for use in the apparatus embodying this invention.

Each cassette 23 which is intended for use with the VTR 20 having automatic shut-off device 314 in accordance with this invention is provided with a transparent leader at least at one end, and preferably at both ends of the magnetic tape T contained within the cassette. Thus, as shown on FIG. 3, transparent leaders 319 and 320 are connected between the opposite ends of the opaque magnetic tape T and the supply and take-up reels 26 and 27, respectively. Whether the tape is wholly contained within cassette 23, that is, in the path $T_1$ (FIG. 1) or withdrawn from the cassette so as to extend about a portion of the periphery of guide drum 24, that is, in the path $L'_1$ (FIG. 2), it will be apparent that light from the source 315 traveling along the path of the beam 317 will reach or impinge on photo-cell 318 only when the light beam 317 is intercepted by one or the other of the transparent leaders 319 and 320, that is, only when the tape is completely unwound from the supply reel 26 or the take-up reel 27, respectively.

In accordance with the present invention, the impingement of light beam 317 from source 315 on photocell 318 is effective to halt the driving of take-up reel 27, as during a recording or reproducing operation or a fast-forward operation of VTR 20, or to halt the driving of supply reel 26, as during a rewinding operation of the VTR.

A specific circuit for halting the driving of either the take-up reel or the supply reel in response to the impingement of light from source 315 on photo-cell 318 is shown on FIG. 4 in which the photo-cell 318 is indicated to be a photo-transistor which is rendered conductive by light impinging thereon after passing through the transparent leader 319 or 320. The illustrated circuit is further shown to include a transistor 321 which becomes conductive when photo-transistor 318 is in its conductive state, and a Schmitt trigger circuit 322 constituted by transistors 323 and 324. When transistor 321 is in its conductive state, the transistor 323 of Schmitt trigger circuit 322 is rendered non-conductive or turned "off"and, in response thereto, the other transistor 324 of such circuit is switched to its "on" or conductive state. The switching of transistor 324 to its conductive state decreases the base potential of a switching transistor 325 which is interposed in the energizing circuit for the coil of a relay R. Relay R IS SHOWN TO HAVE NORMALLY OPEN CONTACTS $R_1$, $R_2$ and $R_3$ which are interposed in the energizing circuits for the solenoids $S_1$, $S_2$ and $S_3$, respectively. It will be apparent that the contacts $R_1$, $R_2$ and $R_3$ of relay R are closed to permit the energizing of the respective solenoids $S_1$, $S_2$ and $S_3$, as previously described, only so long as the coil of relay R is energized, that is, only so long as switching transistor 325 is turned "on" or in its conductive state. Thus, when the base potential of transistor 325 is decreased, as previously described, whereby transistor 325 is rendered non-conductive or turned "off," the resulting deenergizing of the coil of relay R returns the contacts $R_1$, $R_2$ and $R_3$ thereof to their normally open positions for deenergizing any one of the solenoids $S_1$, $S_2$ and $S_3$ that was previously energized, and thereby halting the driving of the take-up reel 27 or the supply reel 26.

The control circuit of FIG. 4 is further shown to include a transistor 326 having its base connected to the circuit for energizing light source or lamp 315 so that transistor 326 is conductive or turned "on" only so long as lamp 315 is operative. Further, transistor 326 is connected to the base of transistor 323 to normally supply the bias for turning on transistor 323 except when transistor 321 is in its "on"or conductive state. Accordingly, if lamp 315 becomes inoperative, transistor 326 is turned "off" and, therefore, the base potential of transistor 323 is decreased to zero with the result that transistor 323 is turned "off," as during the sensing of one of the transparent leaders 319 and 320 by photo-transistor 318, and the coil of relay R is deenergized to again halt the driving of either the supply reel 26 or the take-up reel 27.

Further, if desired, the relay R may have additional normally open contacts $R_4$ interposed in the circuit for energizing solenoid 95 and which are held closed only so long as the coil of relay R is energized. Thus, when the coil of relay R is deenergized in response to the sensing of the leader 319 by photo-transistor 318, or in response to the lamp 315 being inoperative, during a recording or reproducing operation of VTR 20, that is, with the ring 32 in its operative position (FIG. 2), the resultant opening of relay contacts $R_4$ deenergizes solenoid 95 to release latch device 87 and allow pressing assembly 73 to permit the freeing of pinch roller assembly 57 from capstan 66, whereby the driving of the tape by rotated capstan 66 is also halted.

Further, as shown on FIG. 4, a light bulb 327 or audible signal device, such as a buzzer, is preferably provided to indicate to the operator that the described automatic shut-off device 314 has detected either the complete unwinding of the tape from the supply or take-up reel or the inoperativeness of the light source 315. For example, such signal device 327 may be energized through normally closed contacts $R_5$ of the relay R which are opened in response to the energization of the coil of relay R.

In any case, it will be apparent that the device 314 according to this invention is operative to halt the driving of the tape in all operating modes of the VTR when the tape is completely unwound from one or the other of the supply and take-up reels 26 and 27.

Although a specific embodiment of the invention has been described in detail herein with reference to the accompanying drawings, it is to be understood that the invention is not limited to that precise embodiment and that various changes and modifications may be effected therein by one skilled in the art without departing from the scope or spirit of this invention.

What is claimed is:

1. An apparatus for magnetically recording and/or reproducing signals on a magnetic tape which extends between, and is wound on supply and take-up reels contained in a cassette casing having an opening for exposing the tape between the reels, with a transparent leader at least at one end of the magnetic tape, said apparatus comprising support means for receiving and supporting said cassette casing with the supply and take-up reels therein, a tape guide drum having at least one rotary magnetic head associated therewith for scanning the tape when the latter is engaged about at least a portion of the periphery of said drum, tape guide means for selectively leading said tape between the reels in a first path in which the tape is wholly contained in said cassette casing and removed from said guide drum and in a second path which includes a section extending about said portion of the guide drum periphery, said tape guide means including tape loading means movable from an inactive position, at which the tape exposed at said opening is engageable by said tape loading means, to an operative position for withdrawing a loop of the tape from the cassette into said second path, drive means operative to selectively drive the tape in each of said first and second paths from one of said reels onto the other of said reels, sensing means including cooperative spaced apart light directing and light detecting means defining a light path therebetween, one of said light detecting and light directing means extending into said opening of the cassete positioned by said support means and the other of said light detecting and light directing means being spaced from said support means to extend said light path across both of said first and second tape paths so that said light detecting means detects light in said light path only when the latter is intercepted by said transparent leader, and control means for halting the operation of said drive means in response to the detection of light by said light detecting means; and in which said tape loading means includes a rotatable ring extending around said guide drum, a plurality of guides mounted on said rotatable ring and being spaced from said periphery of the drum to move with said support about said drum, and a tape engaging member also mounted on said rotatable ring and extending from the latter to engage the tape between said reels exposed at said cassette opening in said inactive position and being movable with said ring so that, during movement to said operative position, said tape engaging member withdraws said tape loop from said reels and wraps one side of the loop about said portion of the drum periphery while the other side of said loop is engaged with said guides, and further in which said other of the light detecting and light directing means is disposed within said ring with said light path being intercepted by said one side of the tape loop between said guide drum and said cassette.

2. An apparatus for magnetically recording and/or reproducing signals on a magnetic tape which extends between, and is wound on supply and take-up reels, and which has a transparent leader at least at one end of the magnetic tape, said apparatus comprising support means for supporting said supply and take-up reels, a tape guide drum having at least one rotary magnetic head associated therewith for scanning the tape when the latter is engaged about at least a portion of the periphery of said drum, tape guide means for selectively leading said tape between the reels in a first path in which the tape is removed from said guide drum and in a second path which includes a section extending about said portion of the guide drum periphery, drive means operative to selectively drive the tape in each of said first and second paths from one of said reels onto the other of said reels, sensing means including cooperative spaced apart light directing and light detecting means defining a light path therebetween which is intercepted by each of said first and second tape paths so that said light detecting means detects light in said light path only when the latter is intercepted by said transparent leader, and control means including means for halting the operation of said drive means in response to the detection of light by said light detecting means and means for halting the operation of said drive means in response to the inoperativeness of said light directing means.

3. An apparatus for magnetically recording and/or reproducing signals on a magnetic tape which extends between, and is wound on supply and take-up reels, and which has a transparent leader at least at one end of the magnetic tape, said apparatus comprising support means for supporting said supply and take-up reels, a tape guide drum having at least one rotary magnetic head associated therewith for scanning the tape when the latter is engaged about at least a portion of the periphery of said drum, tape guide means for selectively leading said tape between the reels in a first path in which the tape is removed from said guide drum and in a second path which includes a section extending about said portion of the guide drum periphery, drive means operative to selectively drive the tape in each of said first and second paths from one of said reels onto the other of said reels, sensing means including cooperative spaced apart light directing and light detecting means defining a light path therebetween which is intercepted by each of said first and second tape paths so that said light detecting means detects light in said light path only when the latter is intercepted by said transparent leader, control means for halting the operation of said drive means in response to the detection of light by said light detecting means, and signal means operative by said control means to indicate the halting of said drive means by said control means.

4. An apparatus for magnetically recording and/or reproducing signals on a magnetic tape which extends between, and is wound on supply and take-up reels, and which has a transparent leader at least at one end of the magnetic tape, said apparatus comprising support means for supporting said supply and take-up reels, a tape guide drum having at least one rotary magnetic head associated therewith for scanning the tape when the latter is engaged about at least a portion of the periphery of said drum, tape guide means for selectively leading said tape between the reels in a first path in which the tape is removed from said guide drum and in a second path which includes a section extending about said portion of the guide drum periphery, drive means operative to selectively drive the tape in each of said first and second paths from one of said reels onto the other of said reels, sensing means including cooperative spaced apart light directing and light detecting means defining a light path therebetween which is intercepted by each of said first and second tape paths so that said light detecting means detects light in said light path only when the latter is intercepted by said transparent leader, and control means for halting the operation of said drive means in response to the detection of light by said light detecting means; and in which said drive means includes selectively operable means to drive said take-up reel at a normal speed and at a high speed for recording and reproducing operations and for fast-forward operation, respectively, of the apparatus, and means to drive said supply reel at a high speed for rewind operation of the apparatus, and further in which said control means includes means permitting said high speed driving of the take-up and supply reels only when the tape is in said first path removed from said guide drum.

5. An apparatus according to claim 4, in which said control means includes means permitting the driving of said take-up reel at said normal speed only when said tape is in said second tape path so as to extend about said portion of the guide drum periphery.

6. An apparatus for magnetically recording and/or reproducing signals on a magnetic tape which extends between, and is wound on supply and take-up reels, and which has a transparent leader at least at one end of the magnetic tape, said apparatus comprising support means for supporting said supply and take-up reels, a tape guide drum having at least one rotary magnetic head associated therewith for scanning the tape when the latter is engaged about at least a portion of the periphery of said drum, tape guide means for selectively leading said tape between the reels in a first path in which the tape is removed from said guide drum and in a second path which includes a section extending about said portion of the guide drum periphery, drive means operative to selectively drive the tape in each of said first and second paths from one of said reels onto the other of said reels, sensing means including cooperative spaced apart light directing and light detecting means defining a light path therebetween which is intercepted by each of said first and second tape paths so that said light detecting means detects light in said light path only when the latter is intercepted by said transparent leader, and control means for halting the operation of said drive means in response to the detection of light by said light detecting means; and in which said light detecting means is constituted by a photo-transistor which is rendered conductive by light impinging thereon from said light directing means, and said control means includes electro-magnetically operated switch means permitting operation of said drive means only when said switch means is energized, a first transistor through which said switch means is energized when said first transistor is turned on, a second transistor connected with said photo-transistor and being turned on when the latter is rendered conductive, and means connecting said first and second transistors to turn off said first transistor in response to said second transistor being turned on.

7. An apparatus according to claim 6, in which said means connecting the first and second transistors is a Schmitt trigger circuit.

8. An apparatus according to claim 7, in which said Schmitt trigger circuit includes a third transistor connected with said first transistor to remove the base potential from said first transistor and turn off the latter when said third transistor is turned on and a fourth transistor effective to turn on said third transistor when said fourth transistor is turned off, said light directing means includes a light source and a circuit for energizing the latter, a fifth transistor is connected to said circuit for energizing said light source and is turned on in response to the operation of said light source for applying a base potential to said fourth transistor so as to turn on the latter, and said second transistor is connected to the base of said fourth transistor for removing said base potential therefrom when said second transistor is turned on.

* * * * *